US008191662B2

(12) United States Patent
Sauvlet et al.

(10) Patent No.: US 8,191,662 B2
(45) Date of Patent: Jun. 5, 2012

(54) DEVICE AND METHOD FOR HEATING A CRANKCASE VENTILATION SYSTEM IN A HYBRID VEHICLE

(75) Inventors: Nils Sauvlet, Gerlingen (DE); Dieter Kraxner, Wurmberg (DE); Markus Goehring, Nufringen (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 1033 days.

(21) Appl. No.: 12/043,290

(22) Filed: Mar. 6, 2008

(65) Prior Publication Data

US 2008/0245586 A1 Oct. 9, 2008

(30) Foreign Application Priority Data

Apr. 4, 2007 (DE) ........................ 10 2007 016 205

(51) Int. Cl.
*B60K 6/22* (2007.10)

(52) U.S. Cl. ................................. 180/65.27; 180/65.22

(58) Field of Classification Search ............... 180/65.21, 180/65.22, 65.265, 65.27; 123/41.31, 41.86, 123/572, 573, 574
See application file for complete search history.

(56) References Cited

U.S. PATENT DOCUMENTS

| | | | | |
|---|---|---|---|---|
| 4,974,667 | A * | 12/1990 | Sun et al. | 165/41 |
| 5,678,646 | A * | 10/1997 | Fliege | 180/65.1 |
| 6,412,479 | B1 * | 7/2002 | Canfield et al. | 123/573 |
| 6,450,275 | B1 * | 9/2002 | Gabriel et al. | 180/65.23 |
| 6,601,545 | B1 * | 8/2003 | Hohl | 123/41.31 |
| 6,616,059 | B2 | 9/2003 | Sabhapathy et al. | |
| 6,789,613 | B1 * | 9/2004 | Ozaki et al. | 165/140 |
| 2005/0022545 | A1 * | 2/2005 | Taguchi | 62/239 |

FOREIGN PATENT DOCUMENTS

| | | |
|---|---|---|
| DE | 37 26 332 C1 | 6/1988 |
| DE | 103 00 294 A1 | 7/2003 |

* cited by examiner

*Primary Examiner* — Frank Vanaman

(74) *Attorney, Agent, or Firm* — Gerald E. Hespos; Michael J. Porco

(57) ABSTRACT

A device and method for heating a positive crankcase ventilation system in a hybrid vehicle includes a ventilation device, provided on a crankcase, and a supercooling cycle for cooling power electronics for an electric motor of the hybrid vehicle. The ventilation device is heatable by way of the supercooling cycle in order to prevent icing of the ventilation device.

12 Claims, 4 Drawing Sheets

DEVICE AND METHOD FOR HEATING A CRANKCASE VENTILATION SYSTEM IN A HYBRID VEHICLE

CROSS-REFERENCE TO RELATED APPLICATION

This application claims the priority of German Application No. 10 2007 016 205.9, filed Apr. 4, 2007, the disclosure of which is expressly incorporated by reference herein.

BACKGROUND AND SUMMARY OF THE INVENTION

The present invention relates to a device and method for heating a positive crankcase ventilation system so that, in particular, icing of the crankcase ventilation system will be prevented.

Vehicles with so-called hybrid drives have existed for some years as energy saving and environmental friendly alternatives to conventional internal combustion engines. A hybrid drive is usually defined as the combination of a variety of drive principles or the combination of a variety of energy sources for the respective type of drive. Therefore, a hybrid drive generally exhibits two different energy converters and two different energy accumulators. Except for a very few exceptions, in the practical implementation the energy converter involves an internal combustion engine and an electric motor, and the energy accumulator involves a combustible fuel and a battery.

In a vehicle with a hybrid drive both the internal combustion engine and the electric motor can be operated in a respectively optimal efficiency range. Excess energy, for example when braking or during passive coasting, is used via a generator for charging the battery.

When accelerating, the internal combustion engine and the electric motor usually work together, so that, in comparison to a typical internal combustion engine, a smaller engine can be used. Since an internal combustion engine can deliver a very high torque—especially in a higher speed range—the reserved electric motor is more suitable, in particular at start-up, because it can provide a maximum torque even at low speeds. Therefore, in the case of certain driving dynamics both the internal combustion engine and the electric motor can be activated and deactivated, in order to achieve a driving performance that exhibits optimal energy consumption with high efficiency.

Therefore, when hybrid vehicles are in operation, there is frequently the situation that the internal combustion engine is deactivated during the trip. Therefore, in the past, the positive crankcase ventilation system has been known to ice up in conventional vehicles. Positive crankcase ventilation is necessary because gases and unburned fuel can flow on a regular basis from the combustion chambers of the internal combustion engine into the oil circuit. If it is not possible to ventilate, for example, by way of a valve in the crankcase, a dangerous pressure can build up inside the housing and cause damage to the engine.

Especially at low temperatures, for example below 5° C., the air flow conditions produced while driving and the evaporation coldness may cause parts of the crankcase to ice up. Protruding parts, like the ventilation valves or the hoses, which are supposed to remove gases from the interior of the crankcase, are exposed to an especially high risk. Hybrid vehicles, in particular, are exposed to this risk because their analogous parts may cool down faster in a hybrid driving mode when the internal combustion engine is deactivated. In addition, the risk of icing in hybrid vehicles is higher, because the internal combustion engine is often switched off. Moreover, in the event that the internal combustion engine is running, it is running under a high load and, thus, at especially large throttle flap angles. Therefore, an especially strong cold air flow can cause the ventilation system to cool down.

In the past it has been proposed, for example, in the case of conventional motor vehicles, which exhibit only an internal combustion engine, to heat the respective ventilation valves with an electrical heating system in order to prevent the valves from icing. This heating system requires an additional current supply and wiring between the parts to be heated.

The present invention provides an improved device for avoiding icing of the crankcase of an internal combustion engine in a hybrid vehicle.

The inventive device for heating a positive crankcase ventilation system, in particular for that of a hybrid vehicle, has the advantage that, independently of a closed circuit cooling system for the internal combustion engine, which may cool down especially when only the electric motor is running in the hybrid mode, the ventilation system is heated and cannot ice up.

Almost all hybrid vehicles must provide a low temperature or supercooling cycle, which cools the components of the power electronics for the control of the electric motor. Therefore, the invention does not require any additional, for example, an electric, heating system, which entails a higher energy consumption of the entire vehicle.

According to one embodiment of the invention, the supercooling cycle exhibits a first cycle for cooling the power electronics and a cooling subcycle for heating the ventilation system. In this case, the coolant flow rate through the cooling subcycle is configured so as to be controllable. Suitable ventilation devices include, for example, a ventilation valve, a port in the housing, and/or a ventilation hose. At least one follow-up pump is advantageously provided in the supercooling cycle. In order to adjust the coolant temperature in the supercooling cycle (or also the subcycle) to approximately 70° C., a temperature control unit may be provided. For example, a coolant flow rate control unit and a heat exchanger are contemplated, so that when the coolant passes through the subcycle or supercooling cycle, it dissipates thermal energy to the environment.

The invention also provides for applying the device for heating a positive crankcase ventilation system in a hybrid vehicle. In this case, the crankcase is assigned to the internal combustion engine. Therefore, according to the invention, a pre-existing cooling cycle, which usually operates at high coolant temperatures of approximately 100° C., is not used for heating the crankshaft ventilation, but rather portions or a branch of the supercooling cycle are preferably used.

The power electronics exhibits, for example, semiconductor transistors, voltage converters, and/or switching devices having a predefined temperature stability. In one embodiment, the ventilation devices can be heated exclusively by use of the supercooling cycle. However, another embodiment also provides a cooling subcycle for heating the ventilation devices. This cooling subcycle can be supplied with coolant from the closed circuit cooling cycle of the internal combustion engine and/or from the supercooling cycle by way of a controlled valve unit. Thus, it is possible to mix in a controlled manner the coolant, which is identical in design, in order to adjust the temperature of the ventilation devices at the positive crankcase ventilation, for example, as a function of the outside temperature.

The temperature is controlled, preferably, in such a manner that heating the ventilation devices prevents said ventilation devices from icing.

In a preferred embodiment, a heating control unit (or rather a temperature control unit) controls the controllable valve unit in such a manner that in one operating state of the hybrid vehicle, in which the internal combustion engine is deactivated, the coolant is conveyed in essence from the supercooling cycle into the cooling subcycle, whereas in another operating state of the hybrid vehicle, in which the internal combustion engine is activated, the coolant is conveyed in essence from the closed circuit cooling system of the internal combustion engine into the cooling subcycle. In this way, when the internal combustion engine is running, its closed circuit cooling system can be additionally cooled, for example, by heating the ventilation devices, because heat from the respective coolant is transferred to the ventilation devices.

Other objects, advantages and novel features of the present invention will become apparent from the following detailed description when considered in conjunction with the accompanying drawings.

DETAILED DESCRIPTION OF THE DRAWINGS

Figure 1:
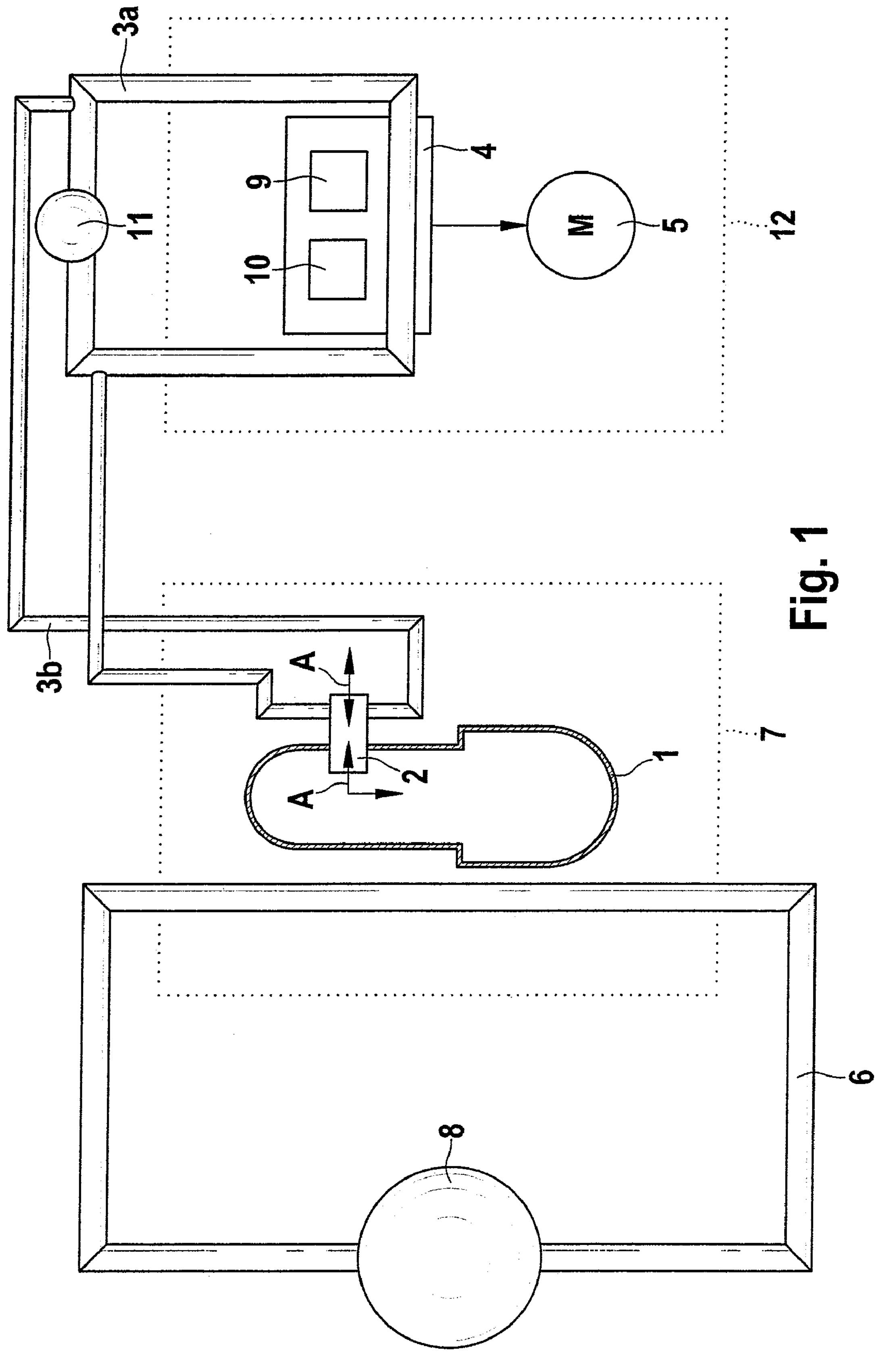
FIG. 1 is a schematic diagram depicting a first embodiment of the invention.

Identical or operationally identical elements are provided with the same reference numerals in the figures.

FIG. 1 is a schematic drawing of a crankcase 1 including a ventilation device 2. The arrows A indicate that air or gases may bring about a pressure equilibrium by way of the ventilation device 2. Ventilation devices may include, for example, valves or simple ports in the crankcase, as well as hoses, which make it possible for air or mixtures of gas and air to escape from the interior of the crankcase to the environment. The crankcase is usually assigned to the internal combustion engine region of a hybrid vehicle. This region is marked with the reference numeral 7 in FIG. 1 (thus dispensing with a graphical rendering of the internal combustion engine). The internal combustion engine is assigned an internal combustion engine closed circuit 6, which contains coolant, which is cooled by way of a heat exchanger 8, for example by way of the cooler of the vehicle, and has a cooling effect for the parts of the internal combustion engine.

In particular, hybrid vehicles have an electric motor 5 (also called an electric machine) in an electric motor region 12. This electric motor is driven by power electronics 4. In this case, the power electronics 4 have to be able to connect and control high voltages, such as 300 V. At the same time, the corresponding electronic components, such as the maximum power switching transistors, heat up and must be cooled by way of a supercooling cycle 3*a*, so that these electronic components are not destroyed. The power electronics 4 include, for example, switching and control elements 9, as well as voltage converters 10, which lower the battery voltage of 300 V to other voltages. A typical temperature for temperature stability of the corresponding electronic components is 70° C. The supercooling cycle 3*a*, or rather the coolant contained in the supercooling cycle, has approximately this temperature.

According to the embodiment of the invention depicted in FIG. 1, a cooling subcycle 3*b* is branched at this point from the supercooling cycle 3*a*. This cooling subcycle leads to the ventilation device 2 of the crankcase 1. By using this subcycle 3*b* the ventilation device 2—for example, a ventilation valve—is also held at a temperature of approximately 70° C. Therefore, at low ambient temperatures at which the hybrid vehicle is put into operation, icing cannot develop.

The supercooling cycle 3*a* may exhibit, for example, an additional heat exchanger 11, which, however, may also be designed jointly with the heat exchanger 8 for the closed circuit cooling system 6 of the internal combustion engine.

While the closed circuit cooling system 6 of the internal combustion engine may exhibit temperatures up to 120° C., the coolant for the power electronics 4 in the supercooling cycle 3 is held at a temperature ranging from 60 to 70° C. If at extremely low temperatures, the ventilation valve 2 ices up, there is the risk that the gases developing in the crankcase may cause the crankcase to burst and, thus, destroy the engine. For example, during the combustion process, gases may enter the interior of the crankcase by way of the cylinders and collect in the crankcase. However, the invention always provide a free and heated valve 2.

The invention makes possible a reliable heating, thus avoiding the icing phenomena at the ventilation valve 2, even if the internal combustion engine 7 of the hybrid vehicle is deactivated; and only the electric motor 5 generates the drive power.

Figure 2:
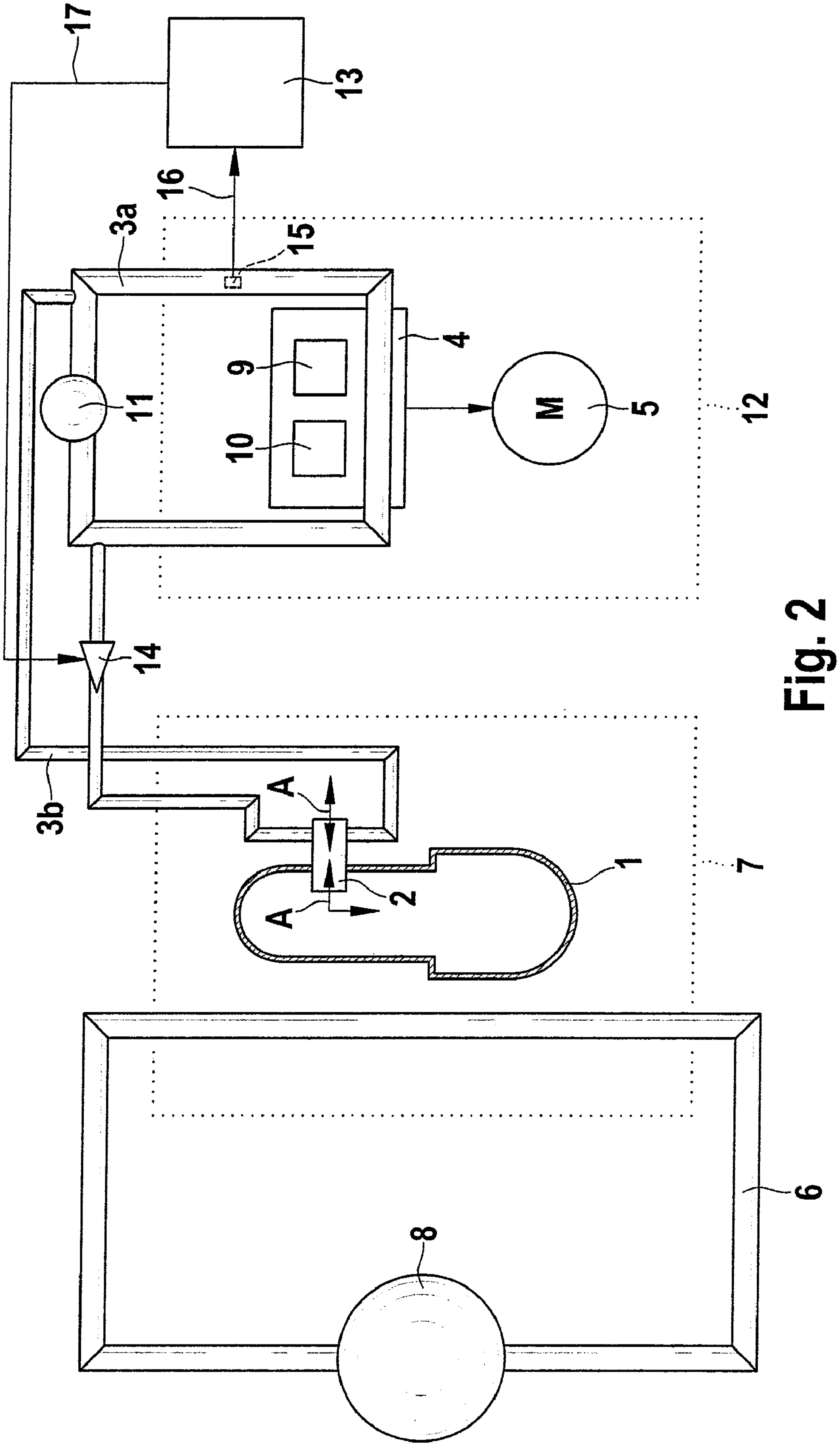
FIG. 2 is a schematic diagram depicting a second embodiment of the invention.

FIG. 2 depicts a second embodiment of an inventive device for heating a positive crankcase ventilation system. FIG. 2 shows, in essence, the same elements that were depicted in the embodiment in FIG. 1. However, the embodiment in FIG. 2 also exhibits a temperature control unit 13, which controls the coolant temperature in the supercooling cycle 3*a*. To this end, for example, a temperature sensor 15 is coupled by way of the measurement lines 16 to the temperature control unit 13, which in turn controls a controllable valve 14 or a controllable pump. By using the controllable valve 14 or the controllable pump, the coolant flow rate through the subcycle 3*b* can be controlled in that the temperature control unit 13 generates control signals by way of the control lines 17. In the embodiments shown in FIG. 1 and FIG. 2, the ventilation device 2 is heated exclusively by use of the supercooling cycle 3.

Figure 3:
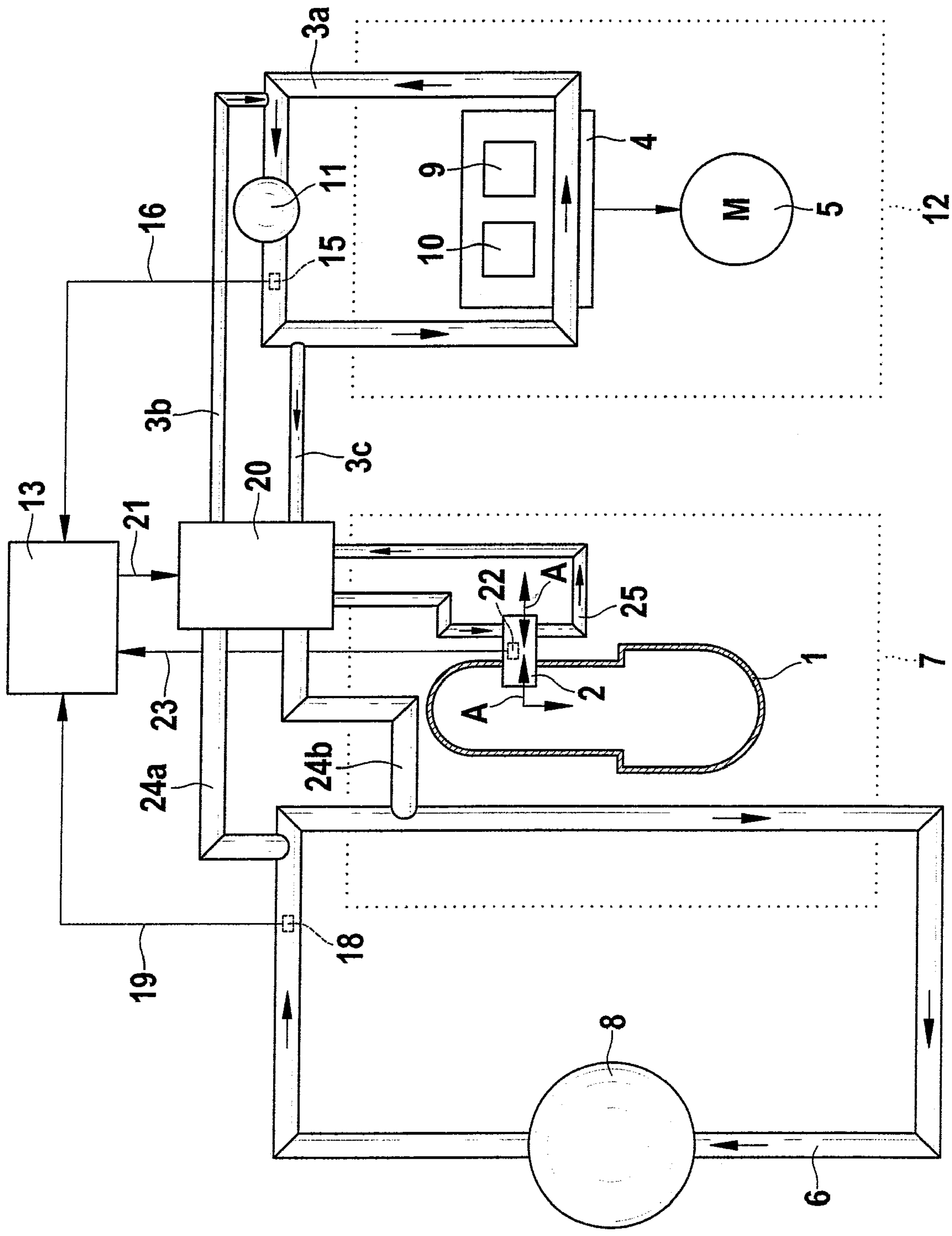
FIG. 3 is a schematic diagram depicting a third embodiment of the invention.

FIG. 3 depicts an expanded embodiment for a device for heating a positive crankcase ventilation system. The elements that are known from FIGS. 1 and 2 are provided with the same reference numerals.

In FIG. 3, there is a coolant mixing device 20, which is controlled by a temperature control unit 13 by way of corresponding control signals, which are sent to the mixing device 20 by way of the control lines 21. The mixing device 20 is coupled via a branch 3*b*, 3*c* to the supercooling cycle 3*a* and is coupled via a branch 24*a*, 24*b* to the closed circuit cooling system 6 of the internal combustion engine. Furthermore, a cooling subcycle 25 is coupled to the mixing device. This cooling subcycle 25 is conveyed to the ventilation valve 2 of the crankcase 1. The mixing device 20 may also be defined as the controllable valve unit. The mixing device 20 allows the coolant from the supercooling cycle 3*a*, obtained by way of the branches 3*b*, 3*c*, 24*a*, 24*b*, and the coolant, supplied by the closed circuit cooling system 6 of the internal combustion engine, to be fed into the cooling subcycle 25, which is used to heat the ventilation valve 2. The suitable temperature setting for heating the ventilation valve 2 is controlled by the temperature control unit 13, which is coupled by way of a measurement line 16 to at least one temperature sensor 15 in the supercooling cycle 3*a* and is coupled by way of a measurement line 19 to at least one temperature sensor 18 in the closed circuit cooling system 6 of the internal combustion engine. Furthermore, the temperature control unit 13 receives, via the measurement lines 23, information about the temperature at the ventilation valve 2 by using an additional temperature sensor 22. Thus, it is possible to control the temperature of the ventilation valve 2, as a function of the temperatures in the closed circuit cooling system 6 of the high temperature internal combustion engine and the low temperature supercooling cycle 3*a*, by way of the temperature control unit 13.

It is contemplated, for example, that in one operating state in which the internal combustion engine 7 is totally deactivated, and only the electric motor 5 is running, the heated coolant of the supercooling cycle 3*a* is conveyed in essence by way of the mixing device 20 into the branched cooling subcycle 25. On the other hand, it is possible that in a driving situation in which only the internal combustion engine 7 is running, the coolant of the closed circuit cooling system 6 of the internal combustion engine is conveyed into the cooling subcycle 25.

Figure 4:
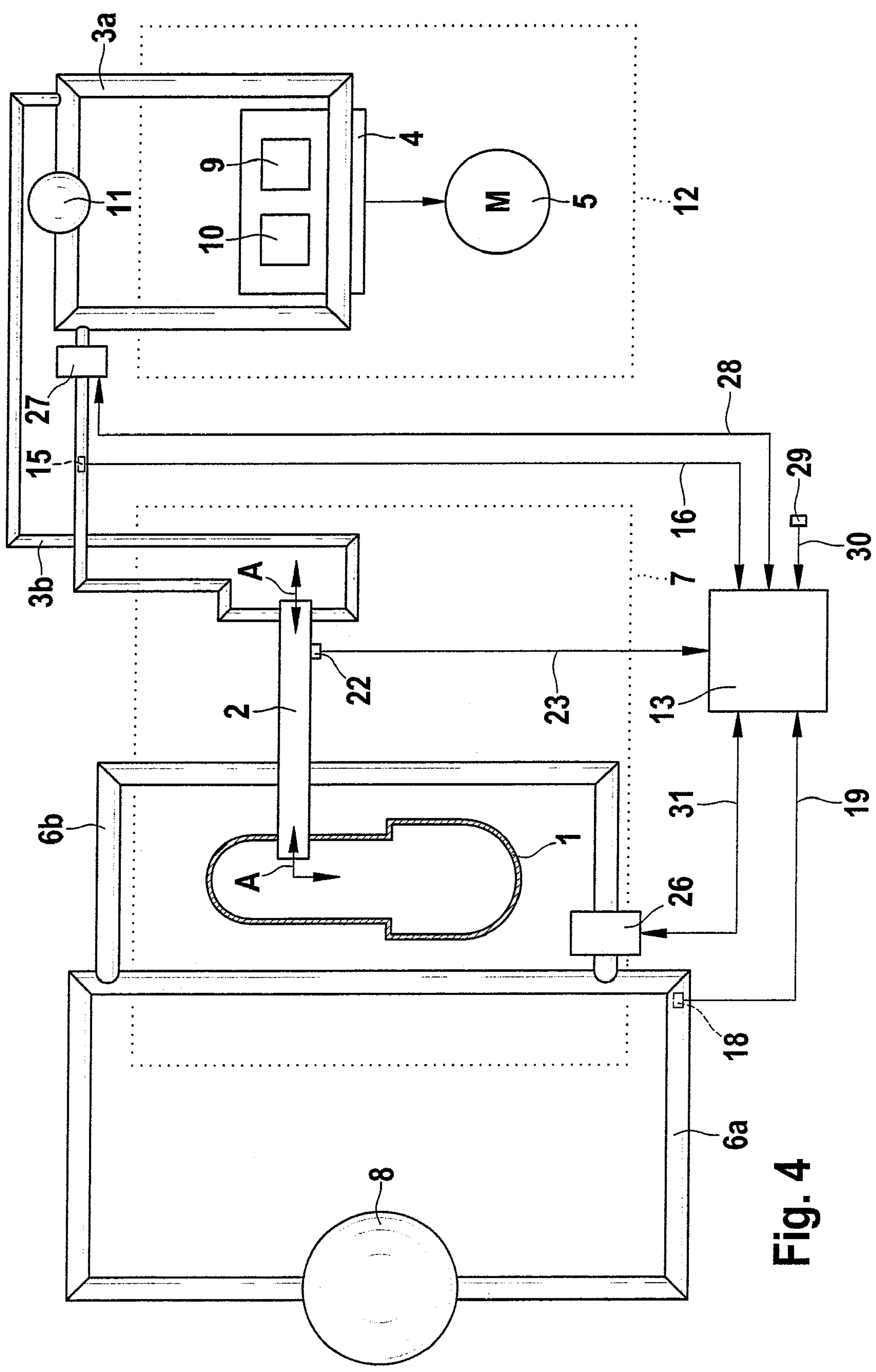
FIG. 4 is a schematic diagram depicting a fourth embodiment of the invention.

FIG. 4 depicts an additional embodiment of a device, which is intended for heating a positive crankcase ventilation system and is employed in a hybrid vehicle. A subcycle 6*b* of the closed circuit cooling system 6 of the internal combustion engine is conveyed to the ventilation device 2. Moreover, a subcycle 3*b* is conveyed from the supercooling cycle 3 to the ventilation device 2. The flow rates of the two subcycles 3*b*, 6*b* may be controlled by way of the controllable valve units 26, 27. To this end, there is a temperature control unit 13, which is coupled by way of a measurement line 16 to a temperature sensor 15 in the supercooling cycle 3. The temperature control unit 13 is also coupled by way of a measurement line 19 to a temperature sensor 18 in the closed circuit cooling cycle 6 of the internal combustion engine. Moreover, the temperature control unit 13 is coupled by way of an additional measurement line 23 to a temperature sensor 22, which is connected to the ventilation valve 2. Finally, the temperature control unit 13 is coupled by way of a measurement line 30 to a temperature sensor 29, which measures the ambient temperature of the vehicle.

The temperature control unit 13 controls the flow rate of the controllable valves 26, 27 by way of suitable control signals, which are sent by way of the control lines 28, 31 to the valve unit 26, 27. By programming the temperature control unit 13, the ventilation valve 2 may be heated, for example, exclusively by use of the subcycle 6*b* of the closed circuit cooling system 6 of the internal combustion engine or exclusively by use of the subcycle 3*b* of the supercooling cycle 3. Depending on the driving situation and the weather conditions, this system can always be relied on to prevent the ventilation valve 2 from icing.

Even though the present invention was explained in detail with reference to the individual embodiments, it is not limited to these embodiments, but rather the invention may be modified in a variety of ways. The temperatures, which were cited as examples and intended for the cooling cycles (or rather the coolant), can be adapted to the properties of the internal combustion engine or the electric motor and/or the temperature stability of the power electronics. Furthermore, additional elements for the individual cooling cycles may be provided—such as follow-up pumps, expansion tanks for the coolant or additional heat exchangers—in order to render it possible to also heat, for example, the passenger interior or to lower the coolant temperatures. Furthermore, the drawings are mere examples and simplified graphical renderings of a positive crankcase ventilation. Besides heating the positive crankcase ventilation, the invention may also be employed for reliable heating of elements that are exposed to the risk of icing in the vehicle.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heating device for a crankcase ventilation system in a hybrid vehicle, comprising:

a ventilation device operatively configured for a crankcase;

a supercooling cycle operatively configured for circulating a supercooling cycle coolant in proximity to power electronics for an electric motor for cooling the power electronics;

a cooling subcycle for circulating a subcycle coolant in proximity to the ventilation device for heating the ventilation device; and a mixing device coupled to the supercooling cycle and to the cooling subcycle so that heat from the supercooling cycle coolant heats the subcycle coolant, temperature sensors in the supercooling cycle and in the ventilation device, a temperature control unit connected to the temperature sensors and to the mixing device, wherein the ventilation device is heatable via the supercooling cycle to prevent icing of the ventilation device and wherein the supercooling cycle coolant flow rate through the supercooling cycle and the subcycle coolant flow rate through the subcycle are controllable by the temperature control unit based on temperatures sensed by the temperature sensors.

2. The device according to claim 1, wherein the ventilation device comprises at least one of a ventilation valve, a port in the crankcase, and a ventilation hose.

3. The device according to claim 1, wherein the temperature control unit is configured for adjusting a coolant temperature of the supercooling cycle to a maximum temperature of approximately 70° C.

4. A hybrid vehicle, comprising:

an internal combustion engine having a crankcase;

an electric motor; and a heating device for a crankcase ventilation system, the heating device comprising:

a ventilation device operatively configured for the crankcase;

a supercooling cycle operatively configured for circulating a supercooling cycle coolant in proximity to power electronics for the electric motor for cooling the power electronics for the electric motor;

a cooling subcycle for circulating a subcycle coolant in proximity to the ventilation device for heating the ventilation device; and a mixing device coupled to the supercooling cycle and to the cooling subcycle so that heat from the supercooling cycle coolant heats the subcycle coolant, temperature sensors in the supercooling cycle and in the ventilation device, and a temperature control unit connected to the temperature sensors and to the mixing device, wherein the ventilation device is heatable via the super cooling cycle to prevent icing of the ventilation device, and wherein the supercooling cycle coolant flow rate through the supercooling cycle and the subcycle coolant flow rate through the subcycle are controllable by the temperature control unit based on temperatures sensed by the temperature sensors.

5. The hybrid vehicle according to claim 4, wherein the ventilation device comprises at least one of a ventilation valve, a port in the crankcase, and a ventilation hose.

6. The hybrid vehicle according to claim 4, wherein the temperature control unit is configured for adjusting a coolant temperature of the supercooling cycle to a maximum temperature of approximately 70° C.

7. The hybrid vehicle according to claim 4, wherein the power electronics comprise at least one of a semiconductor transistor, a voltage converter, and a switching device, having a predefined temperature stability.

8. The hybrid vehicle according to claim 7, wherein the internal combustion engine has a closed circuit cooling system, the closed circuit cooling system being separate from the supercooling cycle and having a higher coolant temperature than the coolant temperature of the supercooling cycle for cooling the power electronics.

9. The hybrid vehicle according to claim 4, wherein the internal combustion engine has a closed circuit cooling system, the closed circuit cooling system being separate from the supercooling cycle and having a higher coolant temperature than the coolant temperature of the supercooling cycle for cooling the power electronics.

10. A method for heating a crankcase ventilation system of a hybrid vehicle having a crankcase assigned to an internal combustion engine and power electronics assigned to an electric motor, the method comprising the steps of:

cooling the internal combustion engine via a closed circuit cooling system having a first coolant temperature;

cooling the power electronics via a supercooling cycle system having a second coolant temperature;

heating a ventilation system of the crankcase via a subcycle of the supercooling cycle system to prevent icing of the ventilation system when the internal combustion engine is deactivated and the electric motor is operating;

measuring temperature in the supercooling cycle system and in the ventilation system; and controlling a flow rate of a supercooling cycle coolant through the supercooling cycle system and a flow rate of a subcycle coolant through the subcycle based on temperatures measured in the supercooling cycle system and in the ventilation system.

11. The method according to claim 10, further comprising the step of:

controlling a coolant temperature of the supercooling cycle system to a maximum temperature of approximately 70° C.

12. The method according to claim 10, wherein the heating of the ventilation system occurs via the subcycle coolant conveyed substantially from the closed circuit cooling system of the internal combustion engine into the cooling subcycle system when the internal combustion engine is activated.

* * * * *